(12) United States Patent
Adams

(10) Patent No.: US 8,806,474 B2
(45) Date of Patent: Aug. 12, 2014

(54) COMPUTER-HARDWARE, LIFE-EXTENSION APPARATUS AND METHOD

(76) Inventor: Phillip M. Adams, Henderson, NV (US)

( * ) Notice: Subject to any disclaimer, the term of this patent is extended or adjusted under 35 U.S.C. 154(b) by 322 days.

(21) Appl. No.: 12/831,963

(22) Filed: Jul. 7, 2010

(65) Prior Publication Data

US 2011/0016463 A1 Jan. 20, 2011

Related U.S. Application Data

(63) Continuation of application No. 10/158,353, filed on May 29, 2002, now Pat. No. 7,779,407.

(51) Int. Cl.
*G06F 9/445* (2006.01)
*G06F 9/44* (2006.01)

(52) U.S. Cl.
USPC ............ 717/174; 717/120; 717/168; 717/176

(58) Field of Classification Search
CPC ................ G06F 8/61; G06F 8/65; G06F 8/71
See application file for complete search history.

(56) References Cited

U.S. PATENT DOCUMENTS

| | | | |
|---|---|---|---|
| 6,138,179 A | 10/2000 | Chrabaszcz | |
| 6,353,928 B1 | 3/2002 | Altberg | |
| 6,527,121 B1 | 3/2003 | Brockelmann | |
| 6,980,959 B1 * | 12/2005 | Garrow et al. | 705/7.21 |
| 7,191,438 B2 * | 3/2007 | Bryant | 717/176 |
| 7,761,867 B2 * | 7/2010 | Goetz et al. | 717/174 |
| 7,996,814 B1 * | 8/2011 | Qureshi et al. | 717/120 |
| 2003/0163807 A1 * | 8/2003 | Drake et al. | 717/174 |
| 2004/0025155 A1 | 2/2004 | Sedlack | |
| 2004/0181790 A1 * | 9/2004 | Herrick | 717/168 |
| 2007/0240154 A1 * | 10/2007 | Gerzymisch et al. | 717/174 |

\* cited by examiner

*Primary Examiner* — Thuy Dao
(74) *Attorney, Agent, or Firm* — Pate Baird, PLLC

(57) ABSTRACT

A computer hardware life-extension apparatus and method is disclosed to circumvent hardware-dependent software installation locks, imposed by selected software packages, which may artificially enforce compliance with a minimum set of hardware requirements before allowing installation. Various techniques may be used to circumvent the artificial hardware locks, thereby effectively extending the useful life, and delaying the forced obsolescence, of selected computer hardware. An apparatus and method in accordance with the invention may be used to extend the life of a wide variety of computer hardware, including but not limited to processors, main memory, secondary storage devices, and the like.

21 Claims, 17 Drawing Sheets

COMPUTER-HARDWARE, LIFE-EXTENSION APPARATUS AND METHOD

RELATED APPLICATION

This application is a continuation of U.S. patent application Ser. No. 10/158,353 filed May 29, 2002, which is incorporated herein by reference in its entirety.

BACKGROUND

1. The Field of the Invention

This invention relates to computer systems and, more particularly, to novel systems and methods for extending the useful life and delaying the obsolescence of computer system hardware.

2. The Background Art

A CPU, also known as a processor, is the processing center of a computer system. A CPU may be designed with a collection of machine language instructions, or instruction set, that the processor understands and follows. Program code, developed to perform a desired task, must ultimately perform its various functions and routines using the instruction set of the processor on which it is processed. As CPU manufacturers, such as Intel, have released newer and faster processor architectures, one hallmark of their evolution and design has been backward compatibility, meaning that newer chips will execute the instruction set of previous processors. However, program code written for newer architectures may not run on the older processors, since new instructions may be utilized. In some cases, the instruction set of a new CPU architecture may only include a few new instructions as compared to its predecessor.

For example, the Intel 80486 (the 486) processor architecture added 6 new instructions to extend its Intel 80386 (the 386) instruction set core. Likewise, the Intel Pentium added 8 new instructions to its 486 instruction set core. In some cases, software may utilize the new instructions, and therefore, not run on older processors. These new instructions, if encountered by an older processor, may incur errors in the operation thereof, and may cause a system shutdown or the like.

As new instructions are added, some software may check the characteristics, such as clock speed, architecture, and the like, of the processor on which it is running. Certain instructions, when executed, simply identify selected characteristics of the processor. These characteristics may be used like flags by the software to decide whether to proceed with execution or to modify execution in some way. For example, the CPUID instruction, introduced to the core instruction set in upgraded processors, may return the values of certain characteristics of a given processor. Some processors may not support this instruction and incur errors when encountered thereby.

Installation programs, used to install many software applications, may check the characteristics of a processor and require that a computer meet a pre-selected set of requirements. For example, a purchased software package may state on its packaging a minimum CPU architecture, clock speed, RAM requirements, and secondary storage (disk capacity) requirements to operate the software. If these minimum system requirements are not met, the installation program may abort the installation process and prevent a user from installing the desired software.

Some software manufacturers may justify this action in order to ensure that a software package performs at what the manufacturer considers a satisfactory level. Unfortunately, some requirements may be artificially imposed. That is, a program may actually run at a satisfactory performance level, as deemed by a user of a computer system, but the user may be prevented from installing and running the software because the manufacturer has artificially locked out selected computer systems. In a sense, the manufacturer of the software has forced obsolescence of the computer system, as in the case of Microsoft and the Windows operating system. This may require a user to unnecessarily upgrade or purchase a new computer system, satisfying the requirements, incurring unneeded frustration, effort, collateral programming, and expense to the user.

In accordance with the issues and problems described hereinbefore, what is needed is a software solution, whereby an older processor may emulate a newer processor's extended features without incurring a significant performance penalty, thereby eliminating the need to unnecessarily upgrade to a newer processor or computer system to host newer operating systems and software.

Alternatively, in cases where hardware-dependent software locks artificially prevent the installation of software, thereby needlessly forcing obsolescence on selected hardware components, what are needed are apparatus and methods to circumvent these locks to allow the proper installation and operation of the subject software.

What is further needed is a software solution to make an older processor indistinguishable from a newer processor or a CPU upgrade to substantially all software accessed thereby, providing the same features and functionality.

What is further needed is a method to effectively "weld" such a software solution to an older processor, in order to mediate and monitor all access and use of the processor.

BRIEF SUMMARY AND OBJECTS OF THE INVENTION

In view of the foregoing, it is desirable to provide a CPU life-extension module that may render a previous CPU indistinguishable from an upgraded CPU to virtually or substantially all operating systems and applications running thereon. Not only may the CPU "appear" to be an upgraded CPU to all software, but the CPU life-extension module may provide the same substantive features and functionality of an upgraded CPU. Thus, the useful life of a CPU may be extended and needless effort and expense may be avoided by the owners and users thereof. In addition, artificial locks and barriers, designed to prevent users from installing and using selected software, may be bypassed.

While some software may utilize newer instructions intended for an upgraded CPU, in many cases, the use of these new instructions may be relatively rare. In some cases, new instructions may only be used to identify and reject "old" processors during installation, and never occur again. In other cases, software may be artificially prevented from running on a particular processor simply due to the lack of a "new" instruction despite the fact that it is not using any of the "new" instructions. In many cases, software, utilizing new instructions may run quite satisfactorily on an older processor if the relatively few newer instructions could be translated into the older processor's native instruction set. Since the new instructions occur relatively infrequently, this translation process may result in very little performance degradation.

Consistent with the foregoing needs, and in accordance with the invention as embodied and broadly described herein, a method and apparatus are disclosed in one embodiment in accordance with the invention as including a processor configured to process data structures comprising executable and operational data. The processor may have a native instruction set that software may use to perform various tasks. A memory device may be operably connected to the processor to store the data structures.

In accordance with the invention, the data structures may include a CPU life-extension module configured to run on the processor and implement new instructions contained in an upgraded CPU's instruction set. The CPU life-extension module may augment the native instruction set of the processor to include additional instructions not previously recognized by the processor.

The CPU life-extension module may be further configured to intervene, when needed, between the processor and data structures processed by the processor, such as applications and the operating system, in order to "appear" to software as an upgraded CPU and to provide the same features and functionality of the upgraded CPU. In certain embodiments, the user may actually be able to choose the extensions to be applied to the CPU. In order to intervene between the processor and the operating system, in certain embodiments, the CPU life-extension module may be installed as a driver. This may allow the CPU life-extension module access to the processor at the highest privilege level.

The processor may be programmed to generate interrupts in response to system faults. The CPU life-extension module may be configured to perform its tasks in response to these interrupts. For example, the CPU life-extension module may be programmed to translate additional instructions, not recognized by the processor, into the processor's native instruction set for processing. This may be accomplished either statically when an application is being loaded or dynamically during execution by responding to an interrupt, generated by the processor, whenever an invalid operation code is encountered. An invalid operation code handler may be invoked that may translate the unrecognized operation code into operation codes recognized by the processor. If the operation code is not recognized by the CPU life-extension module, then the normal invalid operation code procedures may be invoked.

An apparatus and method in accordance with the invention may be programmed to modify system flags to emulate those of an upgraded CPU. For example, a processor may include a flags register containing flags to reflect system status. These flags may indicate whether or not a processor includes various features and functions. The CPU life-extension module may be programmed to detect READ instructions from and WRITE instructions to the flags register and modify the reads and writes to reflect an "extended" flag status corresponding to a CPU in an upgraded state. In certain embodiments, this may be accomplished by maintaining a virtual flags register within the CPU life-extension module.

An apparatus and method in accordance with the invention may configure the processor to generate a stack-fault interrupt whenever the processor pushes data onto the processor's stack. This may be accomplished, in part, by setting the stack size value equal to the address of the current top of the stack. Thus, a stack-fault handler may then be invoked whenever a value is pushed onto the stack. The stack-fault handler may then determine if the operation is pushing values of a flags register onto the stack, and if so, increment the stack size to allow the flags register to be pushed onto the stack, push the flags register onto the stack, and then modify the flag values to emulate those of an upgraded CPU. Thus, in certain embodiments, the modification of the flags register may occur in the copy thereof contained on the stack.

In a similar manner, the stack-fault handler module may be configured to detect future pop operations (e.g. operations pulling values off of the stack), corresponding to push operations (e.g. operations placing values onto the stack), and set breakpoint interrupts to occur in response to the pop operations. A breakpoint handler may then be invoked to decrease the stack size whenever a pop operation occurs. Thus, future push operations will continue to incur a stack-fault interrupt whenever executed. In other embodiments, the stack size may be maintained using approaches such as stack "shadowing", which may maintain a zero-size stack by always invoking a fault handler.

The data structures, in accordance with the present invention, may include an interrupt vector table, having address pointers, used to locate interrupt service routines and fault handlers. The CPU life-extension module may be configured to modify selected address pointers to point to the interrupt handlers and fault handlers used to implement an apparatus and method in accordance with the invention. These may include an invalid operation code handler, stack-fault handler, breakpoint handler, or combinations thereof as needed.

In addition to the foregoing, it is desirable to provide an apparatus and method for circumventing hardware-dependent software installation locks in a computer system. Thus, the useful life of hardware that is artificially excluded from functioning with selected software packages, but in reality is capable and adequate to run the software correctly, may be extended.

An apparatus and method for providing such may include installing a compliant hardware component, such as a compliant CPU, memory module, or disk drive, in a computer system. A compliant hardware component is defined as a component that satisfies the minimum requirements required by the installation routine of a program, operating system, or software package. The installation routine, or program, may abort the installation process of the program, operating system, or software package, if the minimum requirements are not satisfied. For example, a software installation routine or program may require at least a 233 Mhz Pentium processor, at least 128 MB of RAM, and 1 GB of available hard disk space. If these minimum requirements are not satisfied and verifiable by a software installation program, the installation process may be aborted.

Once installation of the subject software package is complete, the compliant hardware component may be removed from the computer system and replaced with a non-compliant hardware component that does not satisfy the minimum requirements of the software package, but is capable of operating correctly with the software package. The software package may then be operated successfully with the supposedly "insufficient" hardware. In certain embodiments, shutting down and rebooting the computer system may be necessary when replacing the hardware. Thus, hardware locks may be circumvented and the useful life of hardware may be extended.

In another embodiment, an apparatus and method in accordance with the invention may be performed in a simulated computer environment, such as with Connectix's Virtual PC or Insignia's SoftPC, in addition to the physical hardware environment hereinbefore discussed. For example, an apparatus and method may include installing a software package in a simulated computer environment, wherein all of the minimum requirements are satisfied in the simulated environment. For example, a simulated environment may provide a sufficient simulated CPU, simulated memory module, and a simulated hard disk, wherein substantially all of the minimum requirements of the software package are satisfied.

Once the software package is installed in the simulated environment, the simulator may be replaced by a simulator that does not satisfy the minimum requirements, but is actually capable of running with the software package correctly and adequately. The software package may then be operated successfully in the supposedly "insufficient" simulated environment. In certain embodiments, shutting down and rebooting the computer system may be necessary when replacing one simulator with another. Thus, as with the physical hardware as discussed hereinbefore, hardware locks may be circumvented and the useful life of simulated hardware may be extended in a simulated environment.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in FIGS. 1 through 17, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
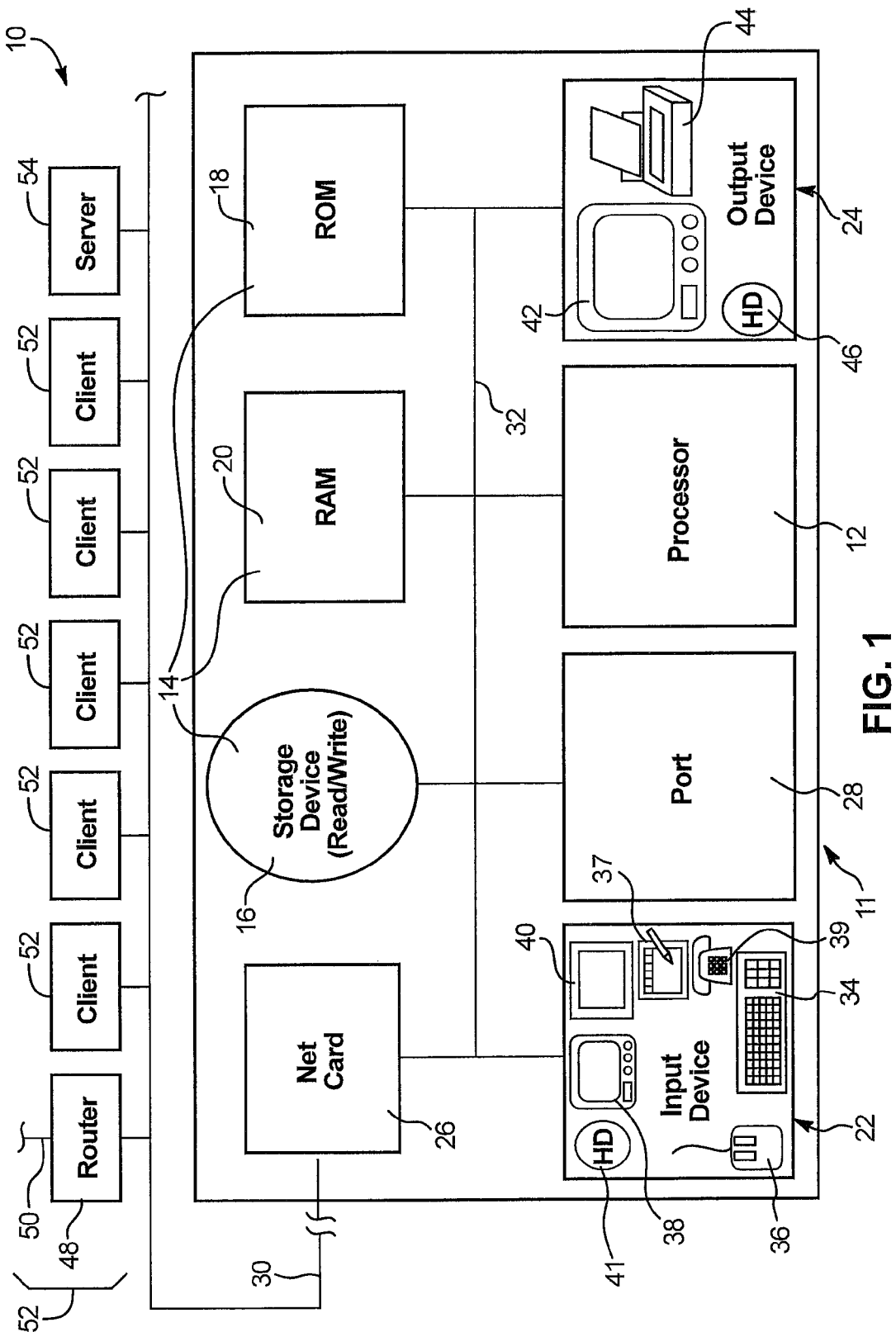
FIG. 1 is schematic block diagram of a computer system in accordance with the invention.

Referring to FIG. 1, an apparatus 10 may implement the invention on one or more nodes 11, (client 11, computer 11) containing a processor 12 (CPU 12). All components may exist in a single node 11 or may exist in multiple nodes 11, 52 remote from one another. The CPU 12 may be operably connected to a memory device 14. A memory device 14 may include one or more devices such as a hard drive or other non-volatile storage device 16, a read-only memory 18 (ROM 18) and a random access (and usually volatile) memory 20 (RAM 20 or operational memory 20).

The apparatus 10 may include an input device 22 for receiving inputs from a user or from another device. Similarly, an output device 24 may be provided within the node 11, or accessible within the apparatus 10. A network card 26 (interface card) or port 28 may be provided for connecting to outside devices, such as the network 30.

Internally, a bus 32, or plurality of buses 32, may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telecommunications line 39, may be used for communication with other devices, with a user, or the like. Similarly, a scanner 40 may be used to receive graphical inputs, which may or may not be translated to other formats. The hard drive 41 or other memory device 41 may be used as an input device whether resident within the node 11 or some other node 52 (e.g. 52, 54, etc.) on the network 30, or from another network 50.

Output devices 24 may likewise include one or more physical hardware units. For example, in general, the port 28 may be used to accept inputs into and send outputs from the node 11. Nevertheless, a monitor 42 may provide outputs to a user for feedback during a process, or for assisting two-way communication between the processor 12 and a user. A printer 44, a hard drive 46, or other device may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 48, 52, 54) may have various communication capabilities.

In certain embodiments, a minimum of logical capability may be available in any node 52. Note that any of the individual nodes 11, 48, 52, 54 may be referred to, as may all together, as a node 11 or a node 52. Each may contain a processor 12 with more or less of the other components 14-46.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12-46 may need to communicate data with one another. A communication link may exist, in general, between any pair of devices.

Figure 2:
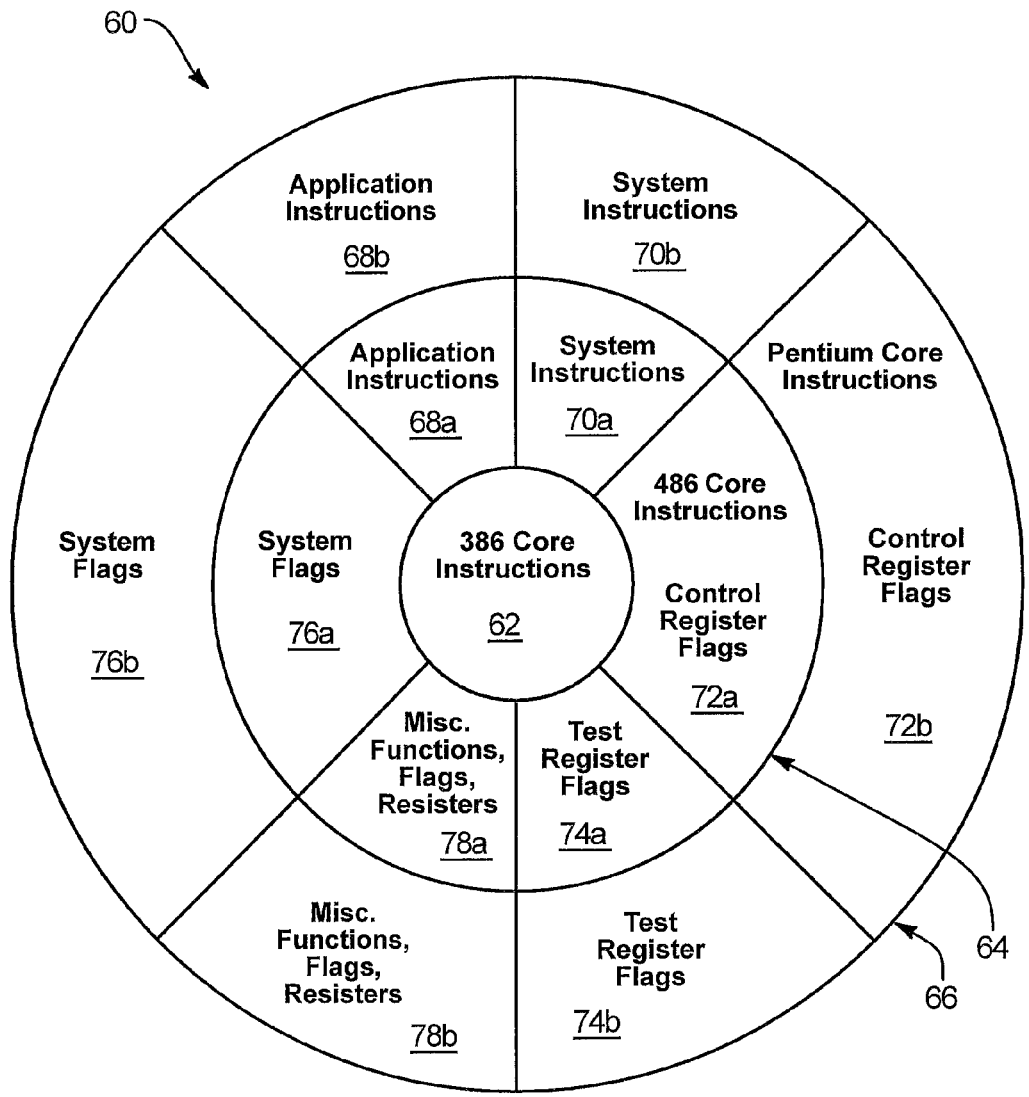
FIG. 2 is a schematic block diagram illustrating a core instruction set of a CPU and examples of additional instructions that may be added as a CPU is upgraded.

Referring to FIG. 2, a CPU 12 may include a core instruction set 62, or native instruction set 62. The instruction set 62 may include all of the instructions or commands that a CPU architecture may recognize and follow. Programs running on the CPU 12 may be required to perform their various tasks using the instruction set 62 of the CPU 12 on which they are running. In this example, an Intel 386 instruction set 62 is illustrated as the core instruction set 62, because the 386 is a 32-bit architecture and addition of new instructions by the 486 and Pentium may be easily illustrated. However, the principles illustrated herein may be applied to any core instruction set 62, such as that used by the Intel 286 or 8086 architectures.

Subsequent upgraded CPU architectures may have instruction sets 64, 66 containing all of the instructions 62 of a preceding CPU architecture in addition to new instructions 68a, 70a, 72a, 74a, 76a, 78a, and 68b, 70b, 72b, 74b, 76b, 78b, respectively. For example, the instruction set 64 of the Intel 486 architecture may provide additional instructions to that used by the 386 architecture 62. New instructions 64 may include application instructions 68a, system instructions 70a, control registers and control flags 72a, test registers and test flags 74a, system flags 76a, as well as other miscellaneous function, flags, and registers 78a.

Application instructions 68a, in general, may include those instructions made available to applications running at any privilege level. System instructions 70a, in general, may refer to special instructions that may only be available to applications running in the most privileged mode, such as by the operating system.

Control registers and control flags 72a are generally registers and flags that provide system level functionality that are used to configure the CPU 12, such as may be required by an operating system. System flags 76a, in general, may provide system status and available system features and may be available to applications running at a lower privilege level, in addition to applications running at a high privilege level, such as an operating system.

Test registers and test flags 74b may also be made available to applications running at a high privilege level, such as an operating system or system diagnostics. Miscellaneous functions, flags, and registers 78a refer to any other function, flags, and registers that the system 10 may use in its operation.

Likewise, the Pentium CPU architecture 66 may provide additional instructions to the 486 and 386 architectures. The Pentium architecture 66 may include new application instructions 68b, system instructions 70b, control registers and control flags 72b, test registers and test flags 74b, system flags 76b, as well as other miscellaneous function, flags, and registers 78b.

In order for a previous architecture 62, such as a 386 architecture, to emulate a newer architecture 64, 66, such as a 486 or Pentium, the additional instructions 64, 66, need to be "welded" closely to the previous architecture 62. That is, a core instruction set 62, provided by a physical processor 12, must include the CPU life-extension module "welded" very closely thereto, so that applications, operating systems, and the like, perceive the software-extended CPU 64, 66 as indistinguishable from the physical upgraded CPU 12.

Figure 3:
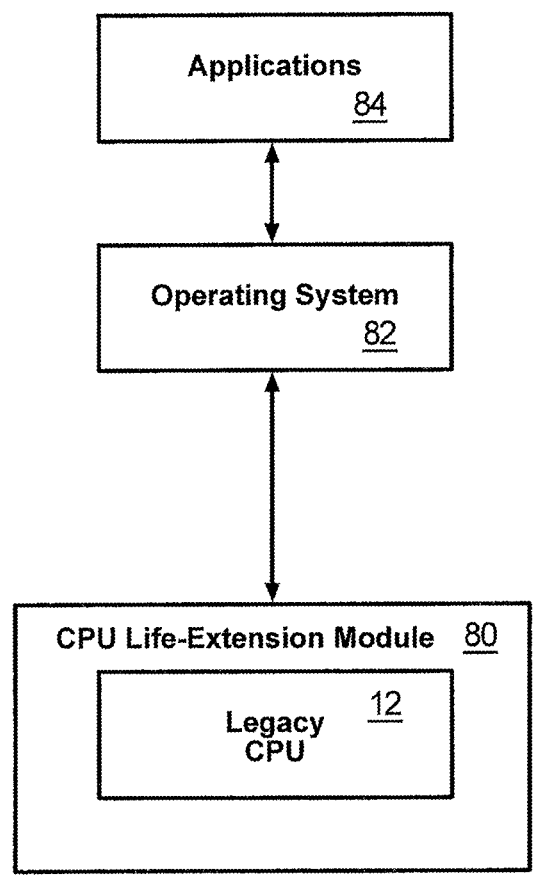
FIG. 3 is a schematic block diagram illustrating a CPU life-extension module mediating all information exchanged between the processor, applications, and the CPU.

Referring to FIG. 3, a CPU life-extension module 80 may mediate all exchanges of data between the operating system 82, applications 84 and the physical CPU 12. Thus, the CPU life-extension module 80 may actually appear, in virtually all respects, to be an upgraded CPU, having an upgraded or enhanced instruction set. Welding the CPU life-extension module 80 to the physical CPU 12 may be necessary to prevent the operating system 82 or applications 84 from bypassing the life-extension module 80 and making calls directly to the CPU 12, thereby possibly incurring errors and impeding proper functioning of the computer system 10.

Since the operating system 82 may function at the highest level of privilege, obtaining a privilege level whereby the CPU life-extension module 80 may have control of all exchanges between the operating system 82, applications 84, and the physical CPU 12, may be difficult to achieve. Therefore, in certain embodiments, the CPU life-extension module 80 may be installed as a system driver. Embodying the CPU life-extension module 80 as a driver may allow the life-extension module 80 to be inserted between the operating system 82 and the CPU 12 and provide the necessary level of privileged access to the CPU 12.

Figure 4:
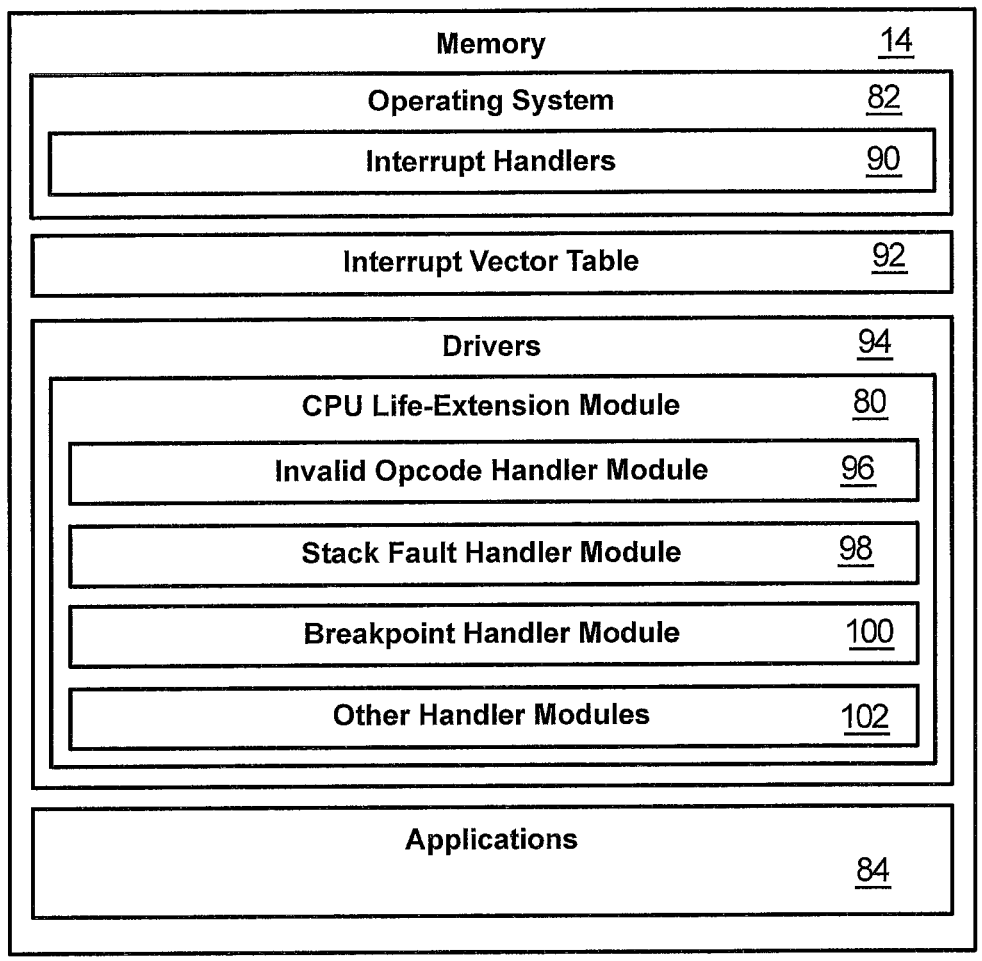
FIG. 4 is a schematic block diagram illustrating a CPU life-extension module residing in the memory of a computer system.

Referring to FIG. 4, an apparatus and method in accordance with the invention may be stored in system memory 14. For example, system memory 14 may include an operating system 82 that may include various interrupt handlers 90 programmed to execute based on the occurrence of system interrupts. The memory 14 may also include an interrupt vector table 92 that may index the system interrupts to corresponding address pointers.

These address pointers may point to memory locations containing service routines, such as drivers 94, programmed to address particular interrupts. Drivers 94 may also be stored in memory 14 and may be configured to control I/O devices 22, 24, or other peripheral hardware connected to the computer system 10. In certain embodiments, a CPU life-extension module 80 may be installed as a driver 94 to achieve a privilege level equal to that of the operating system 82.

The CPU life-extension module 80 may include other modules 96, 98, 100, 102 to perform its various tasks. The function of these modules will be described in further detail. For example, the CPU life-extension module 80 may include an invalid operation code handler module 96, a stack-fault handler module 98, a breakpoint handler module 100, as well as other modules 102.

The invalid operation code handler module 96 may be configured to execute in response to operation codes that are not recognized by the CPU 12. The invalid operation code handler 96 may be programmed to dynamically translate new instructions, intended for an upgraded CPU 64, 66, in terms of instructions of the core instruction set 62. A stack-fault handler module 98 may execute upon occurrence of system stack faults, including overflows and illegal accesses to the stack. A breakpoint handler module 100 may be executed upon occurrence of breakpoints in program code, executed by the processor 12. Likewise, the CPU life-extension module 80 may include other handler modules 102 as needed. In addition, memory 14 may include applications 84 written to run on the CPU 12 or on an upgraded CPU 64, 66. These applications 84 may or may not use new instructions not recognized by the CPU 12, having core instruction set 62.

Figure 5:
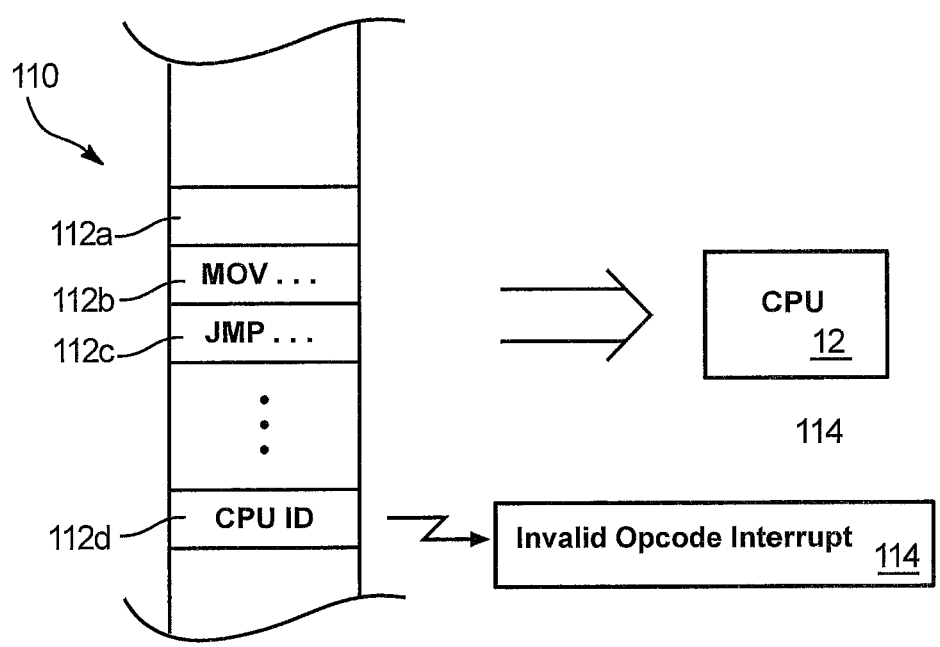
FIG. 5 is a schematic block diagram illustrating program code being processed by a CPU in accordance with the invention.

Referring to FIG. 5, a CPU 12 may be configured to process program code 110 that may include a series of instructions 112*a*, 112*b*, 112*c*, 112*d*. Some instructions 112*b*, 112*c* may be recognized and processed correctly by a CPU 12. Newer instructions 112*d*, intended for an upgraded CPU 64, 66, may not be recognized by the CPU 12 and may generate an invalid operation code interrupt 114 or fault 114 in response to such occurrences.

This may in turn trigger the execution of an interrupt service routine 96 or fault handler 96 programmed to handle invalid operation codes 112*d*. In accordance with the invention, the invalid operation code handler 96 may be programmed such that new instructions, intended for a CPU upgrade 64, 66 may be translated into operation codes recognized by the CPU 12. This process will be described in more detail with respect to the description of FIG. 8.

Figure 6:
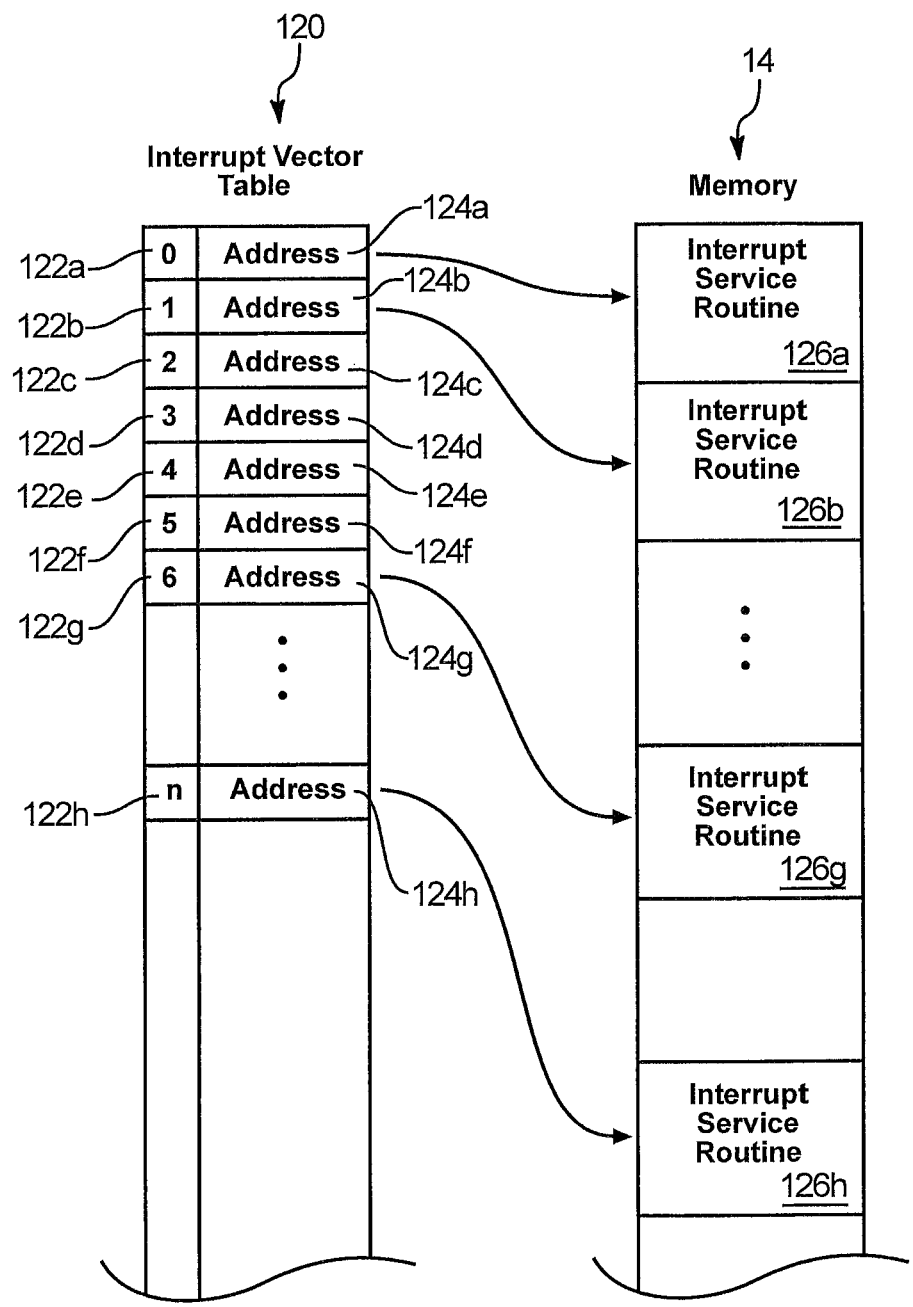
FIG. 6 is a schematic block diagram of a real-mode interrupt vector table used to process system interrupts and interrupt service routines located in computer system memory.

Referring to FIG. 6, contents of a memory device 14 may include a real-mode interrupt vector table 120 used to index various system interrupts 122*a-h* to corresponding address pointers 124*a-h*. The address pointers 124*a-h* may point to locations in memory 14 containing various interrupt service routines 126*a-h* or fault handlers 126*a-h*. These interrupt service routines 126*a-h* may address various interrupts 122*a-h*, such as invalid operation codes, stack faults, breakpoints, and the like. The address pointers 124*a-h* may be modified to point to the various modules in accordance with the invention, such as the invalid operation code handler module 96, the stack-fault handler module 98, and the breakpoint handler module 100. Thus, the interrupt service routines 126*a-h* may be modified or reprogrammed to achieve the objects of the present invention. The use of real-mode examples is not limiting to the scope of the invention, but only used to simplify the description of the invention.

For example, an invalid operation code may trigger an interrupt 122*g*, that in turn may trigger operation of an interrupt service routine 126*g*, programmed to address invalid operation codes. Normally, If the operation code is not recognized by the CPU 12, then a corrective event, such as a system shutdown, may occur. However, the interrupt service routine 126*g* may be reprogrammed or modified, in accordance with the present invention, to determine if the operation code is a new instruction intended for an upgraded CPU 64, 66, and translate the instruction into instructions recognized by the CPU 12.

For example, if a CPUID instruction is encountered, the interrupt service routine 126*g* may be programmed to return the characteristics of an upgraded CPU, as selected by a user. Thus, the interrupt service routine 126*g* may be reprogrammed to handle new instructions. Likewise, other interrupt service routines 126*a-g* may also be reprogrammed to perform various tasks in accordance with the present invention.

Figure 7:
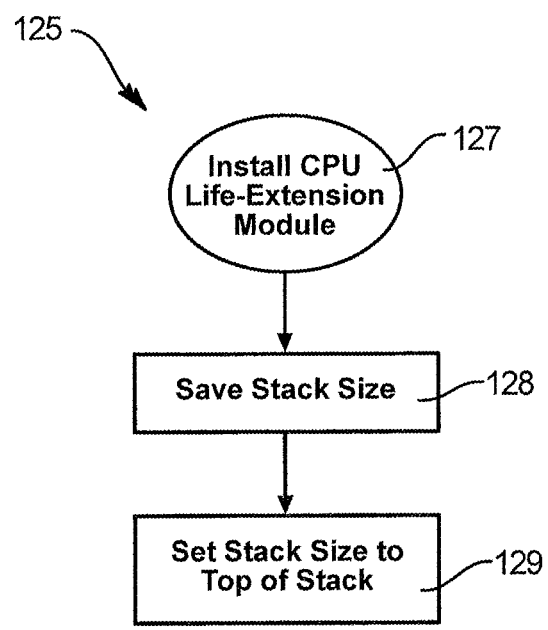
FIG. 7 is a schematic block diagram illustrating various steps executed during an initial installation of one embodiment of a CPU life-extension module.

Referring to FIG. 7, in one embodiment, the CPU life-extension module 80 may begin 127 by saving 128 the current stack size and setting 129 the current stack size to equal the value of the top of the stack. Thus, any values pushed onto the stack will create an overflow condition, thereby generating a stack fault. The stack fault may trigger the execution of the stack-fault handler module 98, that will be described in more detail as part of the description of FIG. 10.

By setting the stack size to the top of the stack, any values pushed onto or popped from the stack may be monitored, thereby turning over control to the CPU life-extension module 80. This operation may be particularly important when the flags register is pushed onto the stack. The CPU life-extension module 80 may then manipulate various flag status values in order to emulate flag status values 76*a* of an upgraded CPU 64, 66.

Figure 8:
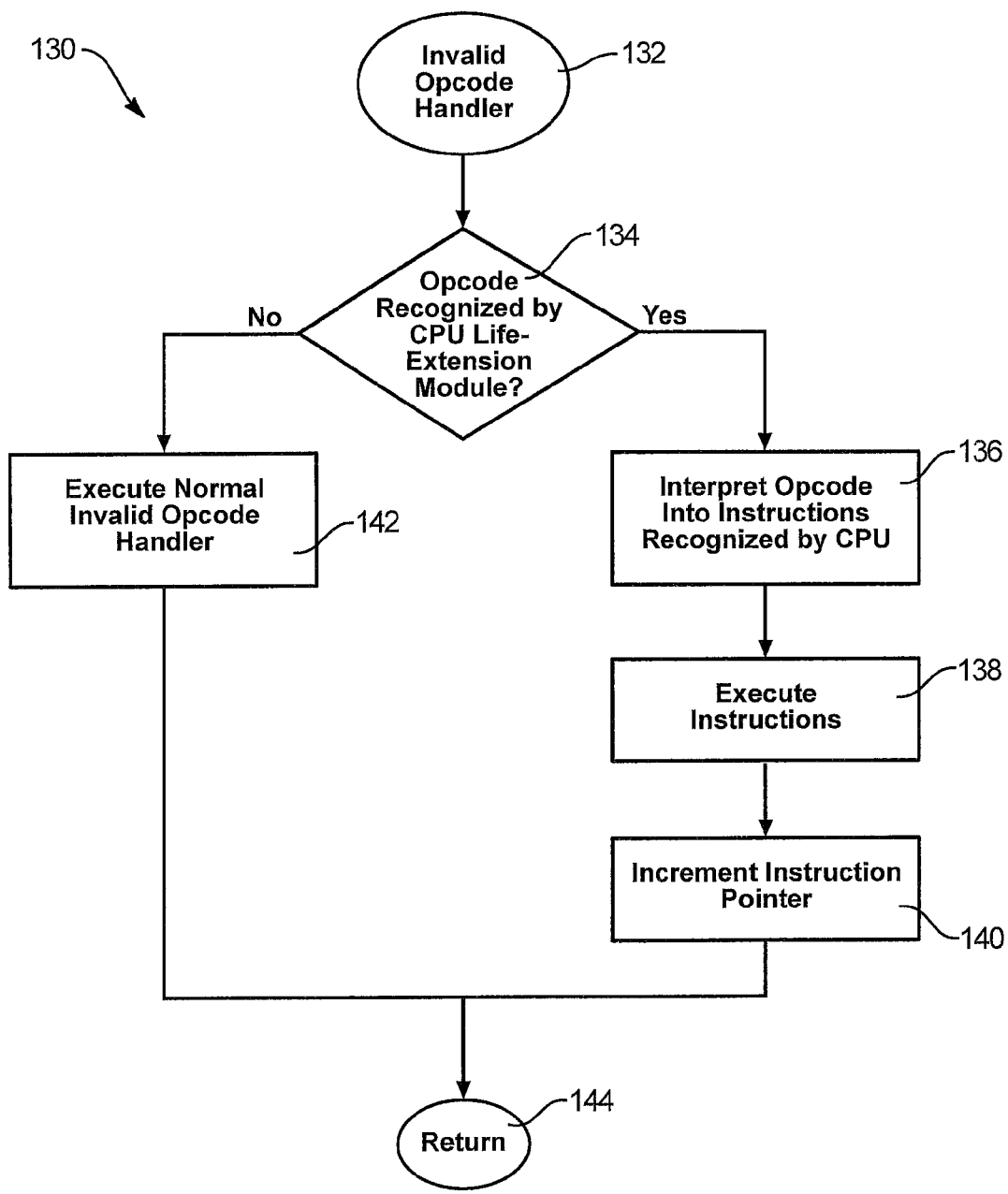
FIG. 8 is a schematic block diagram of a real-mode invalid operation code handler (interrupt service routine) in accordance with the invention.

Referring to FIG. 8, an invalid operation code handler 130 may begin 132 by executing a test 134 to determine if the operation code is recognized by the CPU life-extension module 80. If the operation code is recognized by the CPU life-extension module 80, the operation code may be dynamically translated 136 into instructions recognized by the CPU 12. These instructions may then be executed 138 by the CPU 12. Since the invalid operation code may be dynamically translated and executed within the invalid operation code handler 130, the instruction pointer of the CPU 12 may then be incremented 140 in order to proceed to the next instruction. Operation may then be returned 144 to the interrupted program.

If the operation code is not recognized by the CPU life-extension module 80 at the test 134, the original invalid operation code handler may then be executed 142, invoking a system shutdown, message, or the like. Thus, new instructions intended for an upgraded CPU 64, 66 may be dynamically translated into instructions recognized by an older CPU 12.

Figure 9:
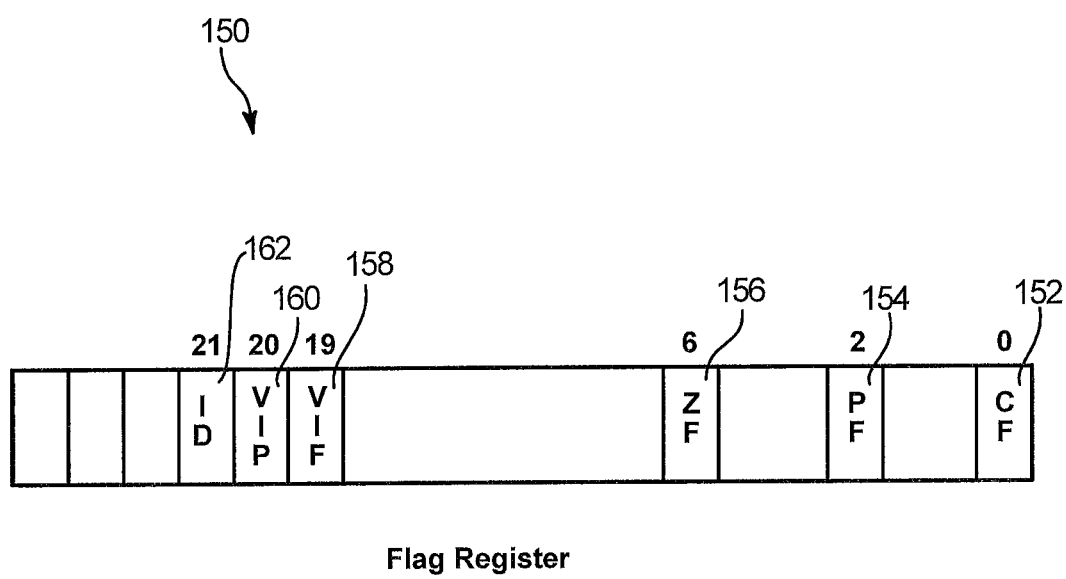
FIG. 9 is a schematic block diagram of a flags register containing the status of various system flags in an upgraded CPU.
Figure 10:
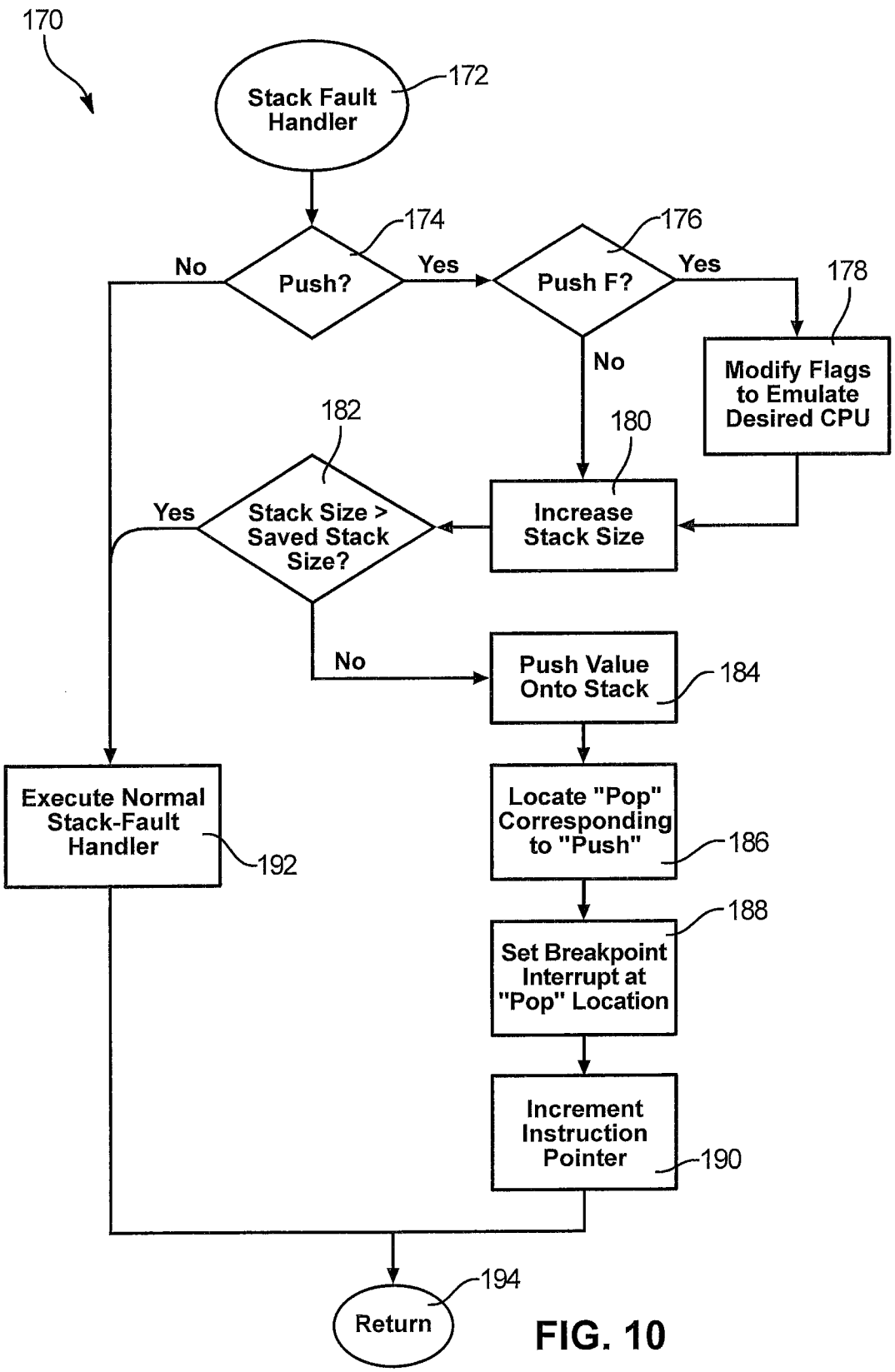
FIG. 10 is a schematic block diagram of one embodiment of a modified real-mode stack-fault handler (interrupt service routine) used in accordance with the invention.

Referring to FIG. 9, as was previously discussed, new instructions may include application instructions 68*a*, system instructions 70*a*, control registers and flags 72*a*, test registers and flags 74*a*, system flags 76*a*, and other miscellaneous functions, flags, and registers 78*a*. The occurrence of new instructions, whether they be application instructions 78*a* or system instructions 70*a*, may be handled by the invalid operation code handler module 96 upon occurrence of an invalid operation code fault 114. Thus, the new instructions may be dynamically translated 136 into instructions recognized by the CPU 12.

Modifying the system flag 76*a* to emulate an upgraded CPU 64, 66 may be much more difficult to implement because the mere reading or writing of a value to a flags register 150 may not generate an error and corresponding interrupt 122. Thus, apparatus and methods are needed to detect READ and WRITE instructions from and to the flags register 150 in order to make modifications to the status contained therein to emulate an upgraded CPU 64, 66.

The flags register 150 may include bits indicating various system status. For example, the flags register 150 may include a carry flag 152 to indicate a carry condition when performing addition, a parity flag 154 to detect data integrity, and a zero flag 156 that may be set when an arithmetic operation results in zero. In addition, other flags may be included to indicate whether a selected CPU 12 includes various features or functions.

For example, an ID flag 162 may be used to determine if the processor 12 supports the CPUID instruction. Similarly, a VIP flag 160 and a VIF flag 158 may be provided to indicate various status in upgraded CPUs 64, 66. Thus, apparatus and methods are needed to detect READs from and WRITEs to the flag register 150 in order to manipulate the flag values to represent an upgraded CPU 64, 66.

In certain embodiments, this may be accomplished by modifying the handler that responds to stack faults. For example, referring to FIG. 10, a stack-fault handler 170 may be configured to execute whenever a value is pushed onto the stack. As was described with respect to FIG. 7, by setting the stack size to the current top of stack, any value pushed onto the stack may generate a stack-fault. Therefore, the "push" command may then be examined to determine if the flag register 150 is to be pushed onto the stack.

For example, a stack-fault handler 170 may begin 172 by executing a first test 174 to determine if the stack-fault was caused by a value being pushed onto the stack. If so, a second test 176 may be executed to determine if the push operation was an attempt to push the flags register 150 onto the stack (pushf command). If it is determined at test 176 that the fault was caused by an attempt to push the flags register 150 onto the stack, the flag status may then be modified 178 to emulate a desired upgraded CPU 64, 66. This may involve modifying one or several bits of the flag status values to emulate an upgraded CPU 64, 66. Once the flag status values are modified to emulate the desired CPU upgrade 64, 66, the stack size may be incremented 180. However, if at the test 176, the "push" operation is determined not to attempt to push the flags register 150 onto the stack, then the flags modification step 178 may be skipped and the stack size may be incremented 180.

After the stack size has been incremented 180, a test 182 may be performed, comparing the current stack size to the saved stack size, saved in step 128, and discussed in the description of FIG. 7. If the stack size is greater than the saved stack size 128, then the stack-fault handler 170 may execute normal stack-fault handling procedures 192 originally corresponding to the operating system 82. However, if in the test 182, the stack size is determined to be less than the saved stack size 128, then the process 170 may continue by actually pushing 184 the subject value onto the stack.

Once the value has been pushed 184 onto the stack, the stack-fault handler 170 may then locate 186, in the program code, the pop operation corresponding to the push operation executed in step 184. The stack-fault handler 170 may then set 188 a breakpoint interrupt to occur in the program code at the location of the pop operation.

One reason for setting 188 a breakpoint interrupt at the location of future pop operations is to allow execution of a breakpoint handler 200 in order to decrement 206 the stack size. Decrementing the stack size, after a pop operation, is important in order to assure that future push operations will incur stack faults. The breakpoint handler 200 will be described in more detail as part of the description of FIG. 11. After the breakpoint interrupt is set 188, the instruction pointer of the CPU 12 may then be incremented 190 to point to the next instruction in the program code. Control may then be returned 194 to the interrupted program.

Figure 11:
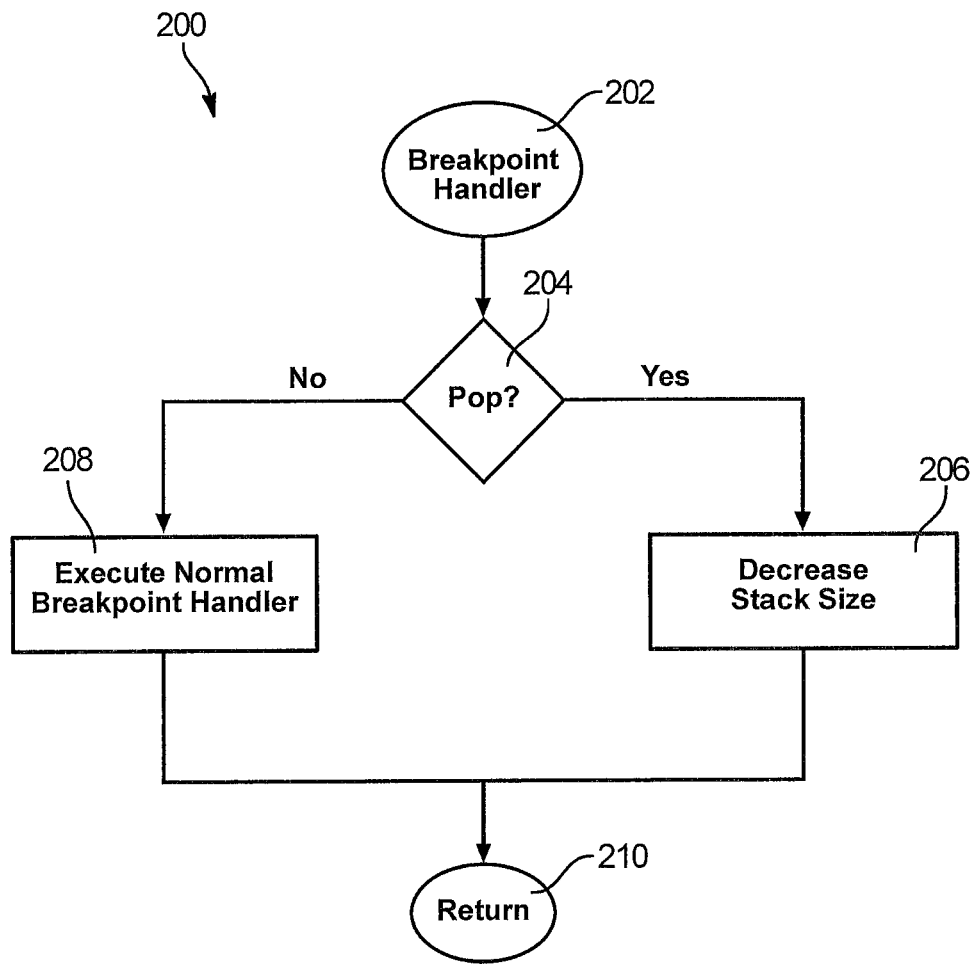
FIG. 11 is a schematic block diagram of one embodiment of a modified real-mode breakpoint handler (interrupt service routine) used in accordance with the invention.

Referring to FIG. 11, a breakpoint handler 200 may begin 202 by performing a test 204 to determine if the breakpoint corresponds to a pop operation. If the breakpoint does correspond to a pop operation, the stack size may then be decremented 206. However, if at the test 204 the breakpoint is determined not to correspond to a pop operation, then the breakpoint handler 200 may execute 208 normal breakpoint handling procedures that may have originally been processed by the operating system 82. Control may then be returned 210 to the CPU 12.

From the above discussion, it will be appreciated that the present invention provides a CPU life-extension module that may make a processor emulate a newer CPU. As has been previously described, an apparatus and method in accordance with the invention may statically or dynamically translate newer instructions, intended for an upgraded CPU, into instructions recognized by the processor, effectively augmenting the processor's instruction set and providing all the functionality of an upgraded CPU. In addition, system flags may be modified to emulate those of an upgraded CPU. As a result, the effective life of a CPU may be extended, thereby reducing expense and lost-time incurred by needing to upgrade a processor.

In certain embodiments, the user may be provided the ability to choose the characteristics of the processor that he wishes emulate. Likewise, the user may choose to execute the invention in any of the modes (real, protected, V86, etc.) of the processor. Thus, the processor may emulate a selected upgraded processor by providing the same level of functionality, features, and may be substantially indistinguishable to all software of certain selected types, or even all applicable software accessed thereby, including the operating system.

Figure 12:
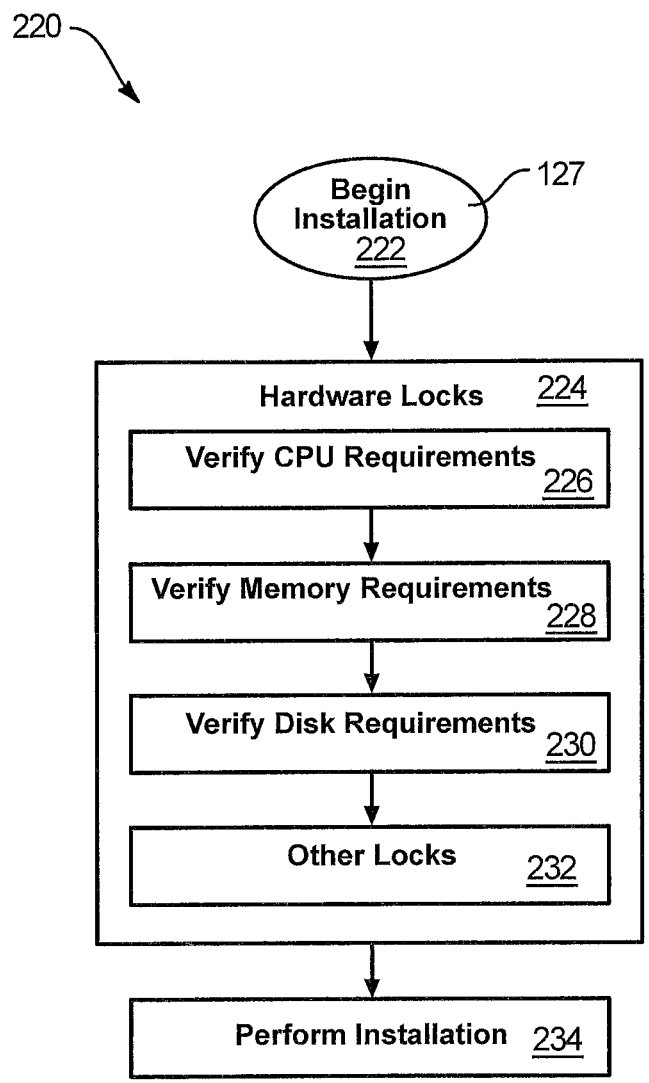
FIG. 12 is a flow chart illustrating a generic installation process of many software packages.

Referring to FIG. 12, as was previously discussed, manufacturers such as Microsoft may employ various hardware locks 224 to artificially exclude certain computer systems 11 from loading 220 or installing 220 selected software packages. Hardware locks 224 may prevent software installation 234 based on a computer system's processor 226, memory size 228, disk size 230, or conceivably any other hardware device 232, such as hardware used for video, sound, communications, networking, and the like. Once a software installation program 220 has verified 226, 228, 230, 232 that a computer system 11 satisfies the minimum requirements 226, 228, 230, 232, the software installation may actually be performed 234.

For example, selected manufacturers may lock out 226 selected processors using CPU locks 226, which may be based on an identification of processor architecture, processor speed, or a combination thereof. An OS or other software by Microsoft, in particular, may employ various mechanisms to determine the architecture and speed of a target processor. In general, software by Microsoft may employ INTEL's application note (AP-485) to identify the processor. The identification of the processor may typically be sufficient to determine the speed of the processor. In some rare cases, software by Microsoft may actually execute a sequence of instructions to determine the speed of the processor.

Figure 13:
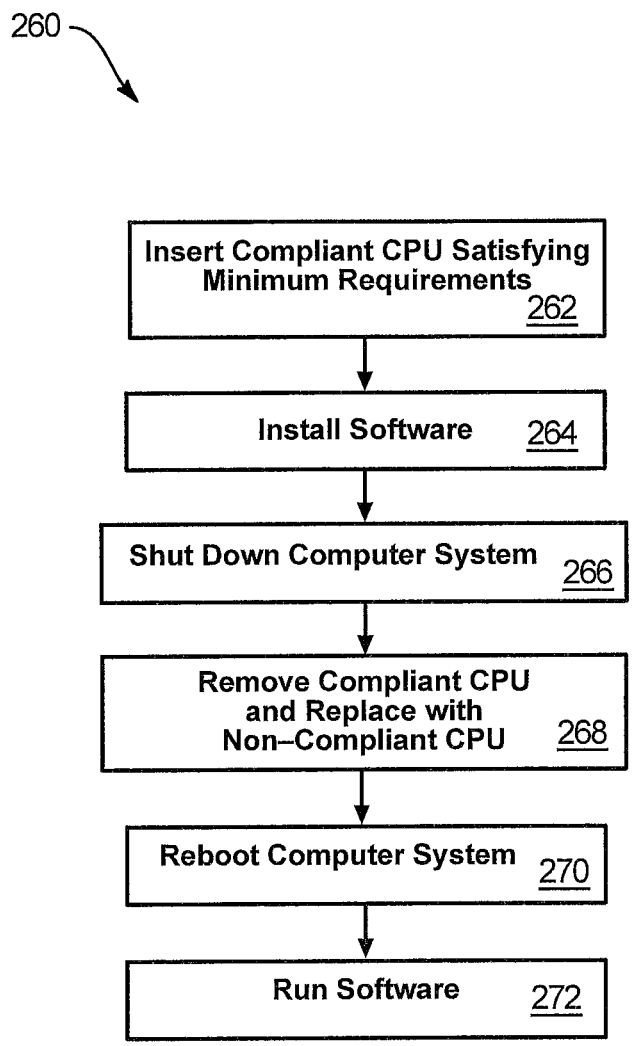
FIG. 13 is a flow chart illustrating one embodiment of a process used to circumvent artificial CPU locks enforced by an installation program.

Referring to FIG. 13, while continuing to refer generally to FIG. 12, each of these operations 226, 228, 230, 232 may be embedded into an installation program 220, such as the Microsoft Windows Installation program 220, which may have no effect on the Windows operating system once it has been installed. In cases where the CPU requirements 226 are artificially imposed, a method to circumvent the CPU lock 226 may include installing 262 a compliant CPU 12 (e.g. one satisfying the minimum speed and architecture requirements) in a computer system 11 in order to permit the proper installation 264 of the Windows operating system. Once the installation 264 is complete, the underlying CPU 12 may be physically replaced 268 with a non-compliant CPU 12, not satisfying the minimum requirements. The operating system may then be operated 272 correctly and without problems using the non-compliant CPU 12.

Although this example may appear to simply be an academic exercise, since an adequate CPU 12 may be present for installation, demonstrating the existence of such artificial CPU locks 224 in the Microsoft Windows Installation program, as well as other software packages, demonstrates the need for methods to circumvent artificially imposed hardware locks 224. Thus, unnecessary expense and labor may be avoided by extending the life of supposedly "incompatible"

processors and software packages may be properly installed and executed, including the Windows Operating Systems.

For example, in one embodiment, a CPU 12 with a specified architecture and performance, such as a 233 MHz Pentium, may be inserted 262 into a motherboard (or equivalent) with a socketed CPU 12, such as a Socket-7 motherboard. The CPU 12 may satisfy the installation requirements 226, 228, 230, 232 of a selected software package, such as the Windows operating system, which may be subsequently installed 264. Once Windows has been installed on the computer system 11, the computer system 11 may be shut down 266, and the 233 MHz Pentium CPU 12 may be physically replaced 268 with a non-compliant CPU 12, such as a 75 MHz Pentium processor. The computer system 11 may then be rebooted 270. Since the 75 MHz Pentium processor may be fully capable of running Windows, the Windows Operating System may be run 272 thereon with substantially no problems.

Figure 14:
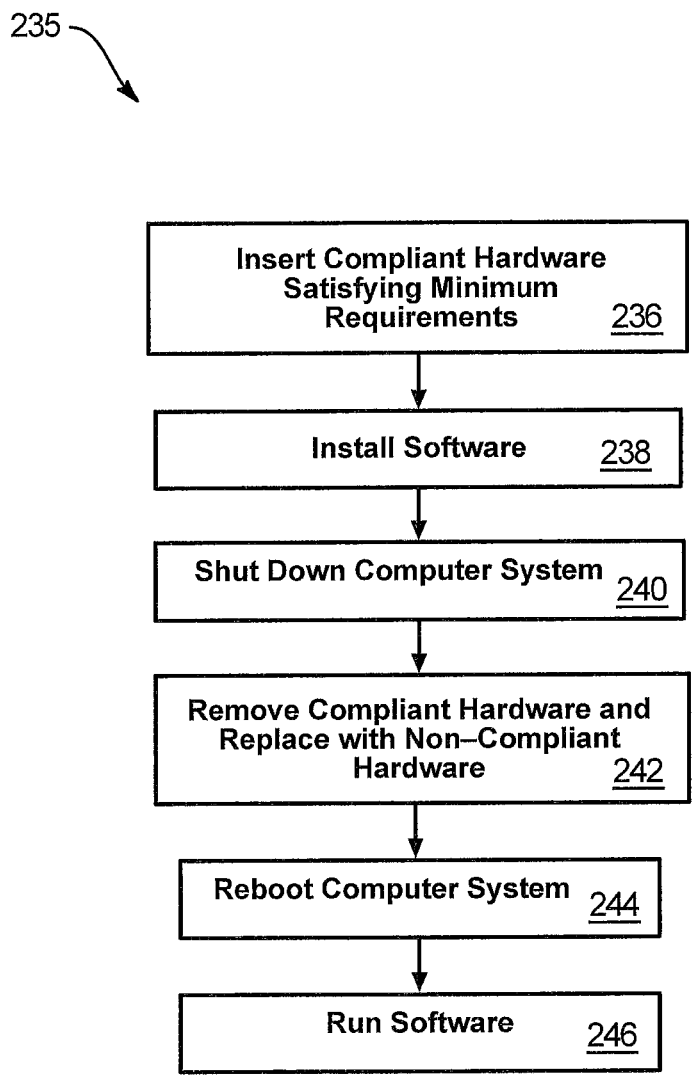
FIG. 14 is a flow chart illustrating one embodiment of a process used to circumvent artificial hardware locks enforced by an installation program.

Referring to FIG. 14, while continuing to refer generally to FIG. 12, apparatus and methods in accordance with the invention may be generally applied to virtually all hardware in a computer system 11 which is artificially excluded by software locks. For example, a compliant hardware component (e.g. one satisfying the minimum speed and architecture requirements) may be physically installed 236 in a computer system 11 to satisfy the minimum requirements of the software, and to permit the proper installation 238 of the software package. Once the installation 238 is complete, the underlying hardware component may be physically replaced 242 with a non-compliant hardware component not satisfying the minimum requirements. Since the non-compliant hardware may be fully capable of functioning with the subject software, the software may be operated 246 therewith with substantially no problems.

One may ask whether this example is simply an academic exercise, since an adequate hardware component is present during the installation process 220. However, unnecessary expense and labor may be avoided by extending the life of supposedly "incompatible" hardware to properly install and execute various software packages, including the Windows Operating Systems.

For example, in one embodiment, a hardware component with a specified architecture and performance, may be inserted 236 into a computer system 11. The compliant hardware component may satisfy the installation requirements 226, 228, 230, 232 of a selected software package, which may be subsequently installed 238. Once the software has been installed 238 on the computer system 11, the computer system 11 may be shut down 240 and the hardware component may be physically replaced 242 with a non-compliant hardware component. The computer system 11 may then be rebooted 244 and the software package may be run 246 thereon with substantially no problems.

Figure 15:
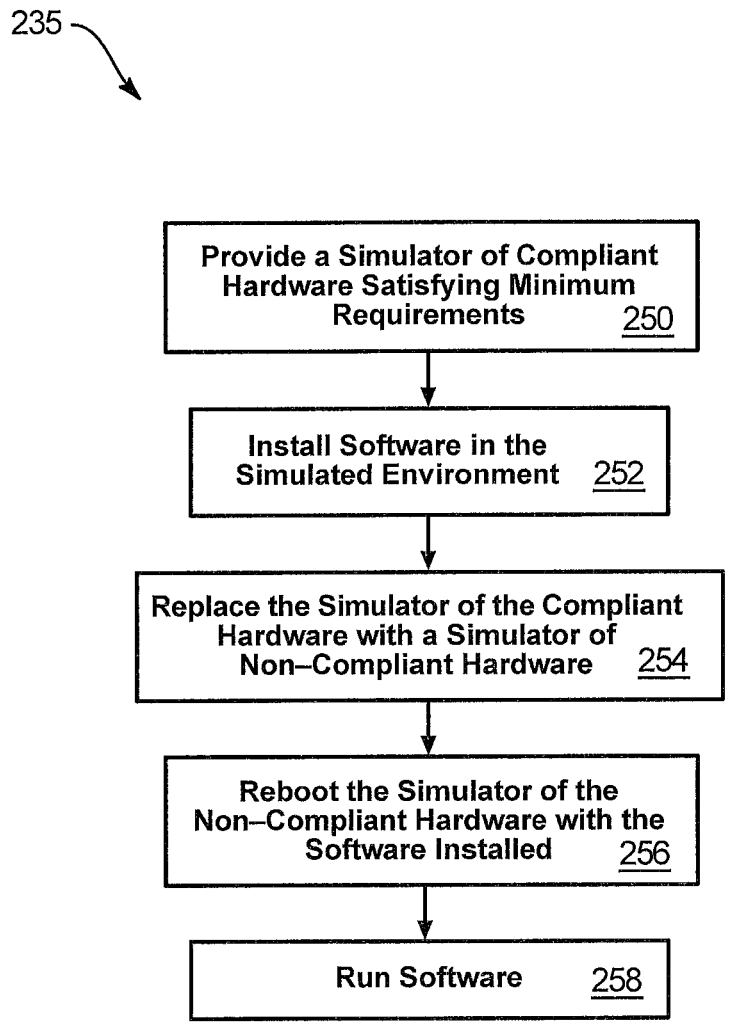
FIG. 15 is a flow chart illustrating one embodiment of a process used to circumvent artificial hardware locks in a simulated environment and enforced by an installation program.

Referring to FIG. 15, while continuing to refer generally to FIG. 12, apparatus and methods in accordance with the invention may be implemented in a simulated environment 248 as well as with actual physical hardware. In simulated environments 248 such as those created by Connectix's Virtual PC or Insignia's SoftPC, a series of steps 250, 252, 254, 256, 258, may be performed to circumvent hardware locks 224 of software installed therewith. For example, the Windows Operating System may be initially installed 252 with a simulated CPU 250 that complies with the requirements for Windows installation, such as a simulated 233 MHz Pentium CPU 250.

Once Windows is installed 252, the simulated CPU 250 may be replaced 254 with a down-graded version 254 of the simulated CPU 250, simulating a non-compliant CPU 254, such as a 75 MHz Pentium processor 254. The simulated CPU 254 may then be rebooted 256 and the installed Windows operating system 254 may be run in the non-compliant simulated environment 248 with substantially no problems. This process 248 may be applied to any simulated hardware component being artificially excluded by software, and is not limited to the CPU 12 speeds and architectures recited in this example.

Thus, the use of artificial CPU hardware locks 226 in the installation process 220 of the Microsoft Windows Operating System, as well as other software packages, may artificially limit the ability of various systems to install and use such operating systems and software, thereby needlessly forcing obsolescence on the subject hardware. Furthermore, the techniques herein described demonstrate that the software, once installed, is not dependent upon the features that the installation procedure 220 may explicitly enforce during the installation process 220.

Figure 16:
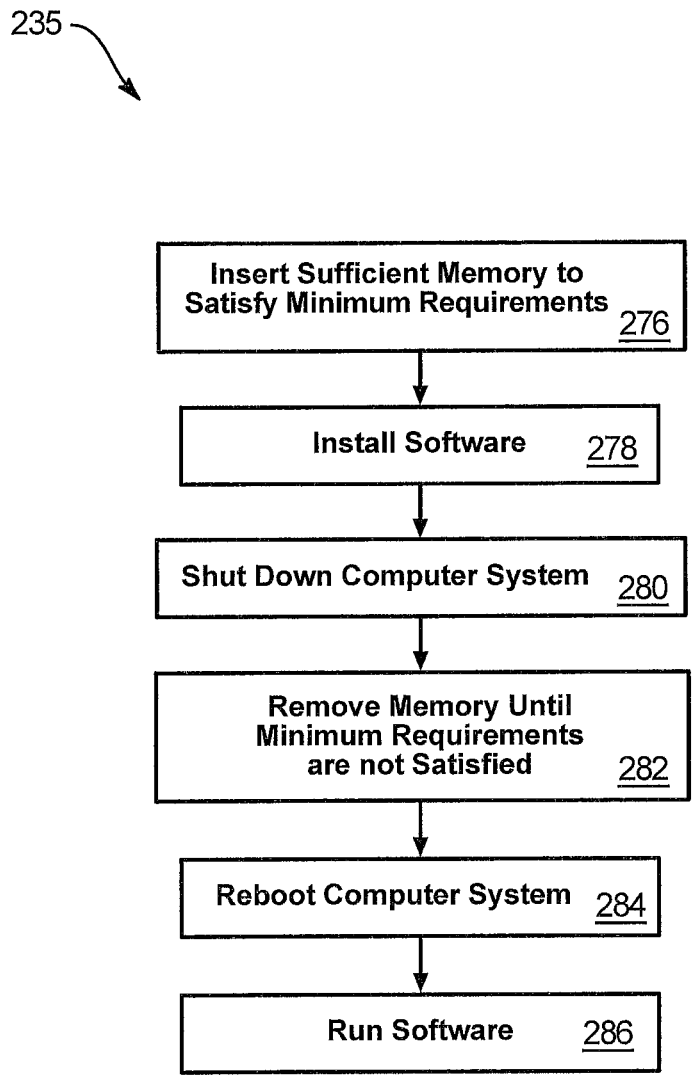
FIG. 16 is a flow chart illustrating one embodiment of a process used to circumvent artificial memory locks enforced by an installation program.

Referring to FIG. 16, while continuing to refer generally to FIG. 12, memory locks 228, such as those enforced by Microsoft brand software, may be based on a combination of callable Windows Application Programming Interfaces (APIs) and information provided by the BIOS at boot time. Installation programs 220, such as those used to install Microsoft Windows, may obtain physical memory resources 228 from the hereinbefore mentioned interfaces. The installation program may subsequently continue or abort the installation process 220, based upon the amount of physical memory 20 that is installed in the computer system 11.

Therefore, in certain embodiments in accordance with the present invention, the Windows operating system may be installed 278 on a computer system 11 having "sufficient" memory 20 to satisfy the minimum requirements. Subsequently, the amount of physical memory 20 may be altered 282 such that the minimum requirements are not satisfied. The Windows operating system, or other software package, may then be operated 286 correctly on the computer system 11 with supposedly "insufficient" memory resources 20. Although an adequate amount of physical memory 20 is required for the initial installation 220, demonstrating that memory requirements 228 enforced by the Microsoft Windows Installation program are not actually required for correct operation highlights the need for methods to circumvent these locks 228.

For example, a process 274 in accordance with the invention, that may be used to circumvent memory locks 228, may include installing 276 an adequate amount of physical memory 20 into a computer system 11 to meet the minimum requirements of a software package's installation program 220, such as that of Microsoft Windows. The software package, in this example Windows, may be subsequently installed 278. The computer system 11 may then be shut down 280 and a portion of the physical memory 20 may be removed 282 from the computer system 11 in order to make the computer system 11 non-compliant with Window's minimum memory requirements.

For example, assuming the installation was performed with a 16-Megabyte and a 128-Megabyte memory module 20, the 128-Megabyte memory module 20 may be removed 282 to leave only 16-Megabytes of physical memory 20 in the computer system 11. The selection of radically different capacity memory modules 20 (e.g. 16-Megabyte and 128-Megabyte modules) may be used to accentuate the artificiality of the Microsoft-enforced memory locks 228. The computer system 11 may then be rebooted 284 and the Windows Operating System may be correctly operated 286 with substantially no problems.

The artificiality of the Microsoft-enforced memory locks 228 may be comprehended more completely by understanding that the Microsoft Windows Operating System is designed as a Demand-Paged Operating System. Stated otherwise, as long as there is a minimal amount of physical memory 20 available in the computer system 11 the Windows Operating System is designed to "page" memory pages in and out of physical memory 20 by storing copies of the memory pages resident on secondary storage media, such as a hard disk 41, 46, network 52, or the like. With this in mind, the function of the Microsoft memory locks 228, outside of artificially forcing obsolescence on a computer system 11, appears to serve little purpose.

Figure 17:
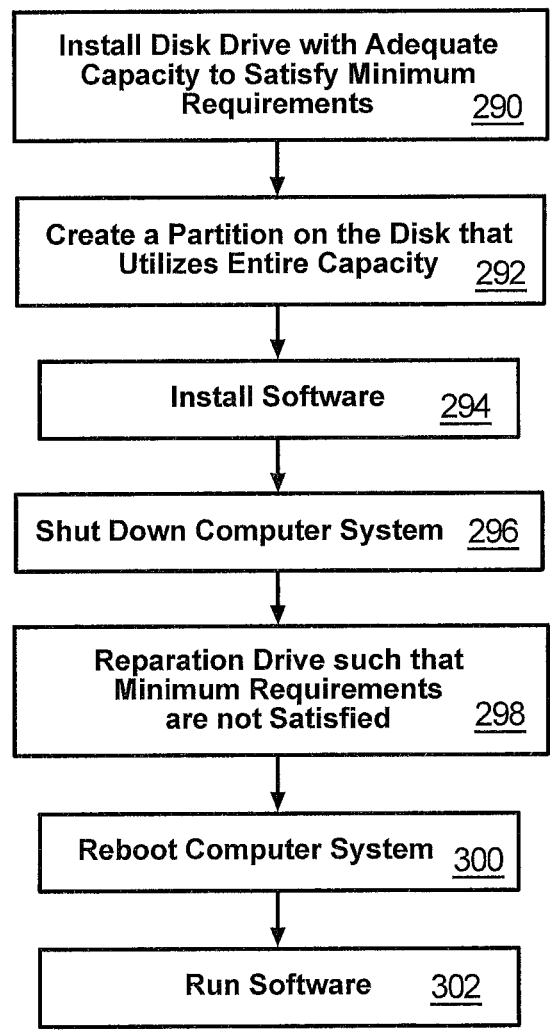
FIG. 17 is a flow chart illustrating one embodiment of a process used to circumvent artificial disk locks enforced by an installation program.

Referring to FIG. 17, while continuing to refer generally to FIG. 12, disk locks 230, such as those imposed by Microsoft, may be based on a combination of callable Windows Application Programming Interfaces (APIs) and information provided by the BIOS at boot time. For example, software installation programs 220, such as the Microsoft Windows installation program 220, may obtain physical disk resources 230 from these interfaces. The installation program 220 may continue or abort the installation process, based on the size of the physical disk 41, 46 installed in the computer system 11.

Therefore, in accordance with the present invention, the Windows operating system may be initially installed 294 on a computer system 11 with a physical disk 41, 46 having a capacity sufficient to satisfy Windows' minimum requirements. Once Windows is installed, the underlying disk capacity may be changed 298 without any negative effects on the operation 302 of the operating system. Although an adequate amount of disk capacity is required for the initial installation, demonstrating that the disk capacity requirements 230 enforced by the Microsoft Windows Installation program 220 are not actually required for correct operation 302 highlights the need for methods to circumvent these locks 230.

For example, a process 288 in accordance with the invention, which may be used to circumvent disk locks 230, may include installing 290 a disk drive 41, 46 with an adequate capacity to satisfy the minimum requirements of a software package's installation program, such as that of Microsoft Windows. In certain embodiments, a single partition may be created 292 on the physical disk 41, 46 that utilizes the entire capacity of the physical disk 41, 46. The software package, in this example Windows, may then be installed. The computer system 11 may be subsequently shut down 296 and a partition resizing operation may be performed 298 on the disk 41, 46 with a disk utility, such as a utility provided by Symantec, V-Comm, or Powerquest (e.g. Partition Magic) in order to make the system non-compliant with the Microsoft-enforced minimum disk space requirements. The computer system 11 may then be rebooted 300 and the Windows Operating System may be run 302 thereon with substantially no problems.

The artificiality of the Microsoft-enforced disk locks 230 may be comprehended more completely by understanding that Microsoft Windows Operating System is designed as a Demand-Paged Operating System. Thus, as long as there is an adequate amount of physical disk space available in the computer system 11, the operating system will operate correctly by "paging" disk pages in and out of physical memory 20. The actual size of the paging file is based upon the size of the physical capacity of the disk 41, 46, and partition size of the disk drive 41, 46 and not the actual disk space required for the Windows Operating System to operate correctly. Therefore, the Microsoft disk locks 230 appear to serve no legitimate purpose. Their purpose is simply artificially forcing obsolescence on a computer system 11.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed and desired to be secured by United States Letters Patent is:

1. A method executed by a processor for circumventing hardware-dependent software installation locks in a computer system environment, the method comprising:
    operating, by a computer system environment having a first hardware component set satisfying minimum requirements, imposed by installation requirements of a selected software package, with respect to at least one of the group consisting of processor speed, processor architecture, main memory capacity, and secondary storage capacity;
    the operating, wherein the first hardware component set includes a secondary storage device having adequate storage space to satisfy the minimum requirements;
    creating a single partitition on the secondary storage device utilizing the entire storage capacity thereof;
    installing, by the computer system environment, the selected software package, comprising running software installation routines;
    if the first hardware component set indeed satisfies the minimum requirements and the software installation for the first hardware component set is successful, then operating a second computer system environment, having a second hardware component set in place of the first hardware set, wherein at least one hardware component in the second hardware component set does not satisfy the minimum requirements imposed by the installation requirements of the selected software package;
    running the selected software package, by the second computer system environment, on the second hardware component set;
    if the selected software package successfully runs on the second hardware component set, then recording the second hardware component set as a set for hardware component circumvention of the hardware-dependent software installation locks.

2. The method of claim 1, wherein installing the selected software package further comprises shutting down the computer system.

3. The method of claim 1, wherein running the selected software package further comprises rebooting the modified computer system.

4. The method of claim 1, wherein first hardware component set further comprises a component selected from the group consisting of a processor, main memory, and a secondary storage device.

5. The method of claim 1, wherein the second hardware component set further comprises a component selected from the group consisting of a processor, main memory, and a secondary storage device.

6. The method of claim 1, wherein the first hardware component set includes a sufficient amount of main memory to comply with the minimum requirements.

7. The method of claim 6, wherein the second hardware component set includes an amount of main memory insufficient to satisfy the minimum requirements.

8. The method of claim 1, wherein the second hardware component set includes a secondary storage device non-compliant with the minimum requirements.

9. The method of claim 1, wherein satisfying minimum requirements includes satisfying minimum requirements with respect to at least one of the group consisting of processor speed, processor architecture, and main memory capacity.

10. A method executed by a processor for circumventing hardware-dependent software installation locks in a simulated computer system environment, the method comprising:
   simulating a computer system environment comprising a first hardware component set satisfying minimum requirements imposed by installation requirements, of a selected software package, with respect to at least one of the group consisting of simulated processor speed, simulated processor architecture, simulated main memory capacity, and simulated secondary storage capacity in a simulated secondary storage device having adequate storage space to satisfy the minimum requirements and partitioned in a single partition utilizing the entire secondary storage capacity thereof;
   installing, in the simulated computer system environment, the selected software package;
   if the first simulated hardware component set indeed satisfies the minimum requirements and simulating the first hardware component set is successful, then simulating a second hardware component set, wherein at least one simulated hardware component in the second hardware component set does not satisfy the minimum requirements imposed by the installation requirements of the selected software package;
   running the software package on the simulated computer system environment;
   if the simulating the second hardware component set is successful, then recording the second hardware component set as a set for hardware component circumvention of the hardware-dependent software installation locks.

11. The method of claim 10, wherein installing the software package further comprises simulating a shut down within the simulated computer system environment.

12. The method of claim 10, wherein running the software package further comprises simulating a reboot of the simulated computer system environment.

13. The method of claim 10, wherein the first simulated hardware component set further comprises a component selected from the group consisting of a simulated processor and a simulated main memory.

14. The method of claim 10, wherein the second simulated hardware component set further comprises a component selected from the group consisting of a simulated processor and a simulated main memory.

15. The method of claim 10, wherein the first simulated hardware component set includes a sufficient amount of simulated main memory to comply with the minimum requirements.

16. The method of claim 15, wherein the second simulated hardware component set includes an amount of simulated main memory insufficient to satisfy the minimum requirements.

17. The method of claim 10, wherein the simulated secondary storage device in the second simulated hardware component set is non-compliant with the minimum requirements.

18. The method of claim 17, wherein satisfying minimum requirements includes satisfying minimum requirements with respect to at least one of the group consisting of simulated processor speed, simulated processor architecture, and simulated main memory capacity.

19. A method for circumventing hardware-dependent software installation locks in a computer system environment, the method comprising:
   operating, by a computer system environment having a first hardware component set that includes a second storage device having adequate storage space satisfying minimum requirements, imposed by installation requirements of a software package, with respect to at least one of the group consisting of processor speed, processor architecture, main memory capacity and secondary storage capacity;
   creating a single partition on the second storage device utilizing the entire storage capacity thereof;
   installing, by the computer system environment, the software package, comprising running software installation routines;
   if the first hardware component set indeed satisfies the minimum requirements and the software installation for the first hardware component set is successful, then operating a second computer system environment, having a second hardware component set in place of the first hardware set, wherein at least one hardware component in the second hardware component set does not satisfy the minimum requirements imposed by the installation requirements of the software package;
   if the software package successfully runs on the second hardware component set, then continuing running the software package, by the second computer system environment, on the second hardware component set.

20. The method of claim 19, wherein the first hardware component set further comprises a component selected from the group consisting of a processor, main memory, and a secondary storage device consitituting the secondary storage capacity.

21. The method of claim 20, wherein satisfying minimum requirements includes satisfying minimum requirements with respect to at least one of the group consisting of processor speed, processor architecture, and main memory capacity.

* * * * *